US012760423B2

(12) United States Patent
Byrd et al.

(10) Patent No.: US 12,760,423 B2
(45) Date of Patent: Oct. 13, 2026

(54) METHOD OF FORMING AN INTERCONNECT COATING FOR AN ELECTROCHEMICAL DEVICE STACK USING LASER SINTERING

(71) Applicant: BLOOM ENERGY CORPORATION, San Jose, CA (US)

(72) Inventors: Adam Byrd, Sunnyvale, CA (US); Zigui Lu, San Jose, CA (US); Guoliang Xiao, Fremont, CA (US); Tad Armstrong, Burlingame, CA (US); Harald Herchen, Los Altos, CA (US); Travis Schmauss, Burlingame, CA (US); Keji Pan, Pleasonton, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 190 days.

(21) Appl. No.: 18/470,064

(22) Filed: Sep. 19, 2023

(65) Prior Publication Data

US 2024/0093376 A1 Mar. 21, 2024

Related U.S. Application Data

(60) Provisional application No. 63/376,521, filed on Sep. 21, 2022.

(51) Int. Cl.
*C23C 24/08* (2006.01)
*C25B 9/65* (2021.01)
(Continued)

(52) U.S. Cl.
CPC .............. *C23C 24/082* (2013.01); *C25B 9/65* (2021.01); *H01M 8/0206* (2013.01);
(Continued)

(58) Field of Classification Search
CPC ....... C23C 24/082; C23C 24/10; C23C 24/08; C25B 9/65; C25B 1/042; C25B 9/75;
(Continued)

(56) References Cited

U.S. PATENT DOCUMENTS 8,652,691 B1 2/2014 Perry et al.
9,437,879 B1 9/2016 Kapor et al.
(Continued)

FOREIGN PATENT DOCUMENTS

CA 3086917 A1 * 1/2021 .......... H01M 4/8621
EP 4033573 A1 7/2022
WO WO2013-130515 A1 9/2013

OTHER PUBLICATIONS

Ishii, Rapid laser processing of thin Sr-Doped LaCrO3-δ interconnects for solid oxide fuel cells, 2020, Energy Technol, 2000364, p. 1-8 (Year: 2020).*

(Continued)

*Primary Examiner* — Dah-Wei D. Yuan
*Assistant Examiner* — Nga Leung V Law
(74) *Attorney, Agent, or Firm* — THE MARBURY LAW GROUP PLLC

(57) ABSTRACT

A method of forming a protective coating on an interconnect for an electrochemical device stack includes providing a powder on the interconnect and laser sintering the powder.

21 Claims, 6 Drawing Sheets

(51) Int. Cl.

| | |
|---|---|
| ***H01M 8/0206*** | (2016.01) |
| ***H01M 8/0217*** | (2016.01) |
| ***H01M 8/0226*** | (2016.01) |
| ***H01M 8/0228*** | (2016.01) |

(52) U.S. Cl.
CPC ....... *H01M 8/0217* (2013.01); *H01M 8/0226* (2013.01); *H01M 8/0228* (2013.01)

(58) Field of Classification Search
CPC ..... C25B 9/77; H01M 8/0206; H01M 8/0217; H01M 8/0226; H01M 8/0228; H01M 2008/1293; H01M 8/0208; H01M 8/021; H01M 8/0215; Y02E 60/50
See application file for complete search history.

(56) References Cited

U.S. PATENT DOCUMENTS

| | | | | |
|---|---|---|---|---|
| 9,452,475 | B2 | 9/2016 | Armstrong et al. | |
| 9,468,736 | B2 | 10/2016 | Darga et al. | |
| 9,502,721 | B2 | 11/2016 | Herchen et al. | |
| 9,559,365 | B1 | 1/2017 | Kapoor | |
| 9,634,335 | B2 | 4/2017 | Ashary | |
| 9,847,520 | B1 | 12/2017 | Majagi et al. | |
| 9,923,211 | B2 | 3/2018 | Batawi et al. | |
| 10,079,393 | B1 | 9/2018 | Verma et al. | |
| 10,431,833 | B2 | 10/2019 | Wilson et al. | |
| 10,553,879 | B2 | 2/2020 | El Batawi et al. | |
| 10,763,533 | B1 | 9/2020 | El Batawi et al. | |
| 10,873,092 | B2 | 12/2020 | Khurana et al. | |
| 11,355,762 | B2 | 6/2022 | Gasda et al. | |
| 11,417,894 | B2 | 8/2022 | Armstrong | |
| 2013/0230644 | A1 | 9/2013 | Armstrong et al. | |
| 2013/0230792 | A1* | 9/2013 | Wilson | C23C 4/11 429/509 |
| 2015/0147679 | A1 | 5/2015 | Darga et al. | |
| 2015/0194682 | A1 | 7/2015 | Ashary | |
| 2015/0311538 | A1 | 10/2015 | Batawi et al. | |
| 2018/0166703 | A1 | 6/2018 | El Batawi et al. | |
| 2018/0248202 | A1 | 8/2018 | Khurana et al. | |
| 2018/0366743 | A1* | 12/2018 | Armstrong | H01M 8/0228 |
| 2019/0372132 | A1 | 12/2019 | Gasda et al. | |
| 2021/0135251 | A1* | 5/2021 | Leming | H01M 8/2465 |
| 2021/0313658 | A1 | 10/2021 | Verma et al. | |
| 2022/0009124 | A1 | 1/2022 | Xiao et al. | |
| 2022/0231308 | A1 | 7/2022 | Armstrong et al. | |
| 2022/0315479 | A1 | 10/2022 | Gasda et al. | |
| 2022/0336828 | A1 | 10/2022 | El Batawi et al. | |
| 2022/0344676 | A1 | 10/2022 | Armstrong | |
| 2022/0393219 | A1 | 12/2022 | Edmonston et al. | |

OTHER PUBLICATIONS

European Patent Office, Extended European Search Report for European Patent Application No. 23198175.4, mailed Feb. 27, 2024, 8 pages.

Ishii, A. et al., "Rapid Laser Processing of Thin Sr-Doped LaCrO3-δ Interconnects for Solid Oxide Fuel Cells," Energy Technology, vol. 8, No. 10, (2020); XP093126225, https://doi.org/10.1002/ente.202000364.

* cited by examiner

METHOD OF FORMING AN INTERCONNECT COATING FOR AN ELECTROCHEMICAL DEVICE STACK USING LASER SINTERING

FIELD

The present embodiments are directed to fuel cell and electrolyzer interconnect manufacturing methods, specifically methods of forming an interconnect coating using laser sintering.

BACKGROUND

A typical solid oxide fuel cell stack includes multiple fuel cells separated by metallic interconnects (IC) which provide both electrical connection between adjacent cells in the stack and channels for delivery and removal of fuel and oxidant. The metallic interconnects are commonly composed of a Cr based alloy such as an alloy which has a composition of 95 wt % Cr-5 wt % Fe, or Cr—Fe—Y having a 94 wt % Cr-5 wt % Fe-1 wt % Y composition. The CrFe and CrFeY alloys retain their strength and are dimensionally stable at typical solid oxide fuel cell (SOFC) operating conditions, e.g. 700-900 C in both air and wet fuel atmospheres. However, fabrication of the interconnects is relatively complex and expensive.

SUMMARY

According to various embodiments, a method of forming a protective coating on an interconnect for an electrochemical device stack includes providing a powder on the interconnect, and laser sintering the powder.

DETAILED DESCRIPTION

The various embodiments will be described in detail with reference to the accompanying drawings. The drawings are not necessarily to scale, and are intended to illustrate various features of the invention. Wherever possible, the same reference numbers will be used throughout the drawings to refer to the same or like parts. References made to particular examples and implementations are for illustrative purposes, and are not intended to limit the scope of the invention or the claims.

Ranges can be expressed herein as from "about" one particular value, and/or to "about" another particular value. When such a range is expressed, examples include from the one particular value and/or to the other particular value. Similarly, when values are expressed as approximations, by use of the antecedent "about" or "substantially" it will be understood that the particular value forms another aspect. In some embodiments, a value of "about X" may include values of +/−1% X. It will be further understood that the endpoints of each of the ranges are significant both in relation to the other endpoint, and independently of the other endpoint.

Figure 1A:
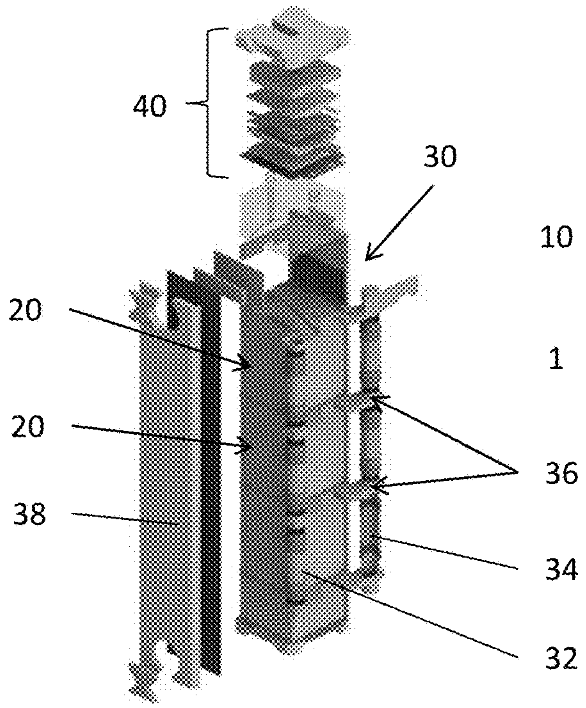
FIG. 1A (Related Art)
FIG. 1A is a perspective view of a conventional fuel cell column.
Figure 1B:
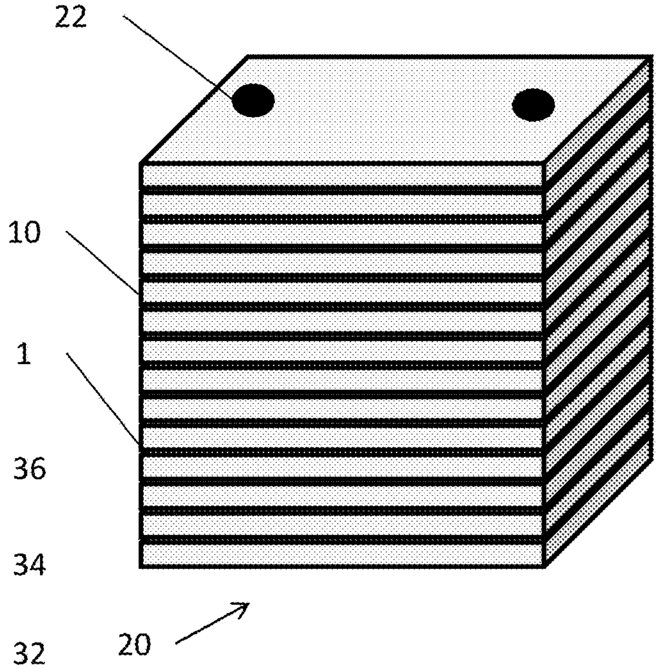
FIG. 1B (Related Art)
FIG. 1B is a perspective view of one counter-flow solid oxide fuel cell (SOFC) stack included in the column of FIG. 1A.
Figure 1C:
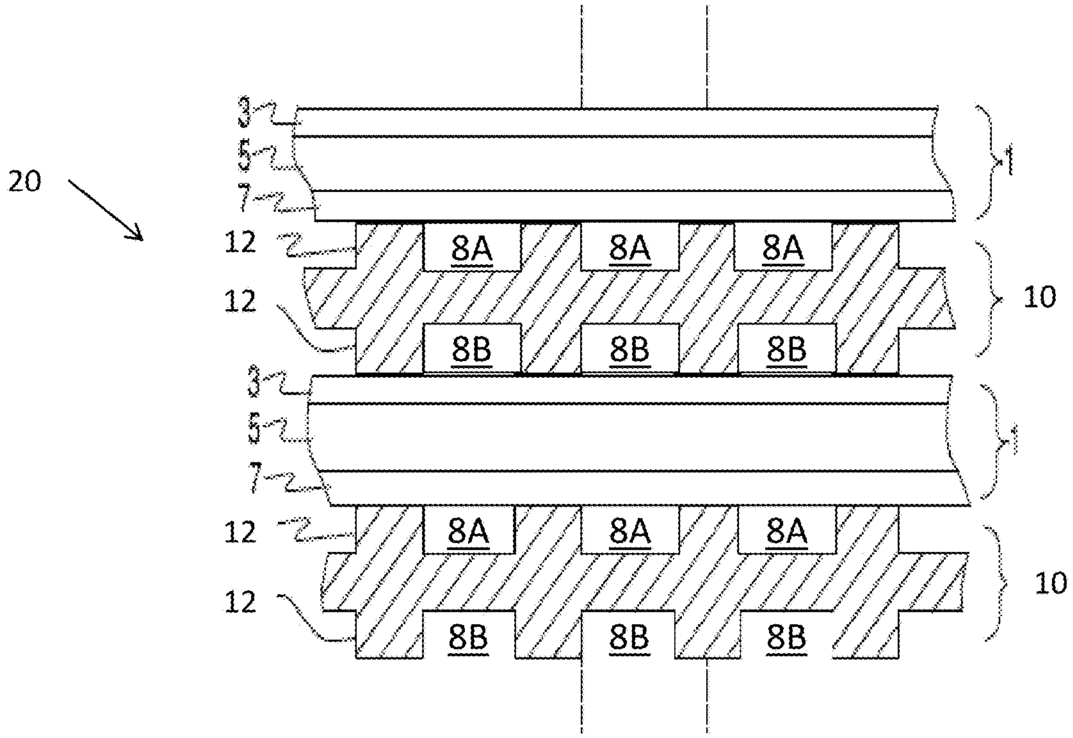
FIG. 1C (Related Art)
FIG. 1C is a side cross-sectional view of a portion of the stack of FIG. 1B.

FIG. 1A is a perspective view of a conventional fuel cell column 30, FIG. 1B is a perspective view of one counter-flow solid oxide fuel cell (SOFC) stack 20 included in the column 30 of FIG. 1A, and FIG. 1C is a side cross-sectional view of a portion of the stack 20 of FIG. 1B.

Referring to FIGS. 1A and 1B, the column 30 may include one or more stacks 20, a fuel inlet conduit 32, an anode exhaust conduit 34, and anode feed/return assemblies 36 (e.g., anode splitter plates (ASPs) 36). The column 30 may also include side baffles 38 and a compression assembly 40. The fuel inlet conduit 32 is fluidly connected to ASPs 36 and is configured to provide the fuel to each ASP 36, and anode exhaust conduit 34 is fluidly connected to ASPs 36 and is configured to receive anode fuel exhaust from each ASP 36.

The ASPs 36 are disposed between the stacks 20 and are configured to provide a hydrocarbon fuel to the stacks 20 and to receive anode fuel exhaust from the stacks 20. For example, the ASPs 36 may be fluidly connected to internal fuel riser channels 22 formed in the stacks 20, as discussed below.

Referring to FIG. 1C, the stack 20 includes multiple fuel cells 1 that are separated by interconnects 10, which may also be referred to as gas flow separator plates or bipolar plates. Each fuel cell 1 includes a cathode electrode 3, a solid oxide electrolyte 5, and an anode electrode 7.

Each interconnect 10 electrically connects adjacent fuel cells 1 in the stack 20. In particular, an interconnect 10 may electrically connect the anode electrode 7 of one fuel cell 1 to the cathode electrode 3 of an adjacent fuel cell 1. FIG. 1C shows that the lower fuel cell 1 is located between two interconnects 10.

Each interconnect 10 includes ribs 12 that at least partially define fuel channels 8A and air channels 8B. The interconnect 10 may operate as a gas-fuel separator that separates a fuel, such as a hydrocarbon fuel, flowing to the fuel electrode (i.e. anode 7) of one cell in the stack from oxidant, such as air, flowing to the air electrode (i.e. cathode 3) of an adjacent cell in the stack. At either end of the stack 20, there may be an air end plate or fuel end plate (not shown) for providing air or fuel, respectively, to the end electrode.

Figure 2A:
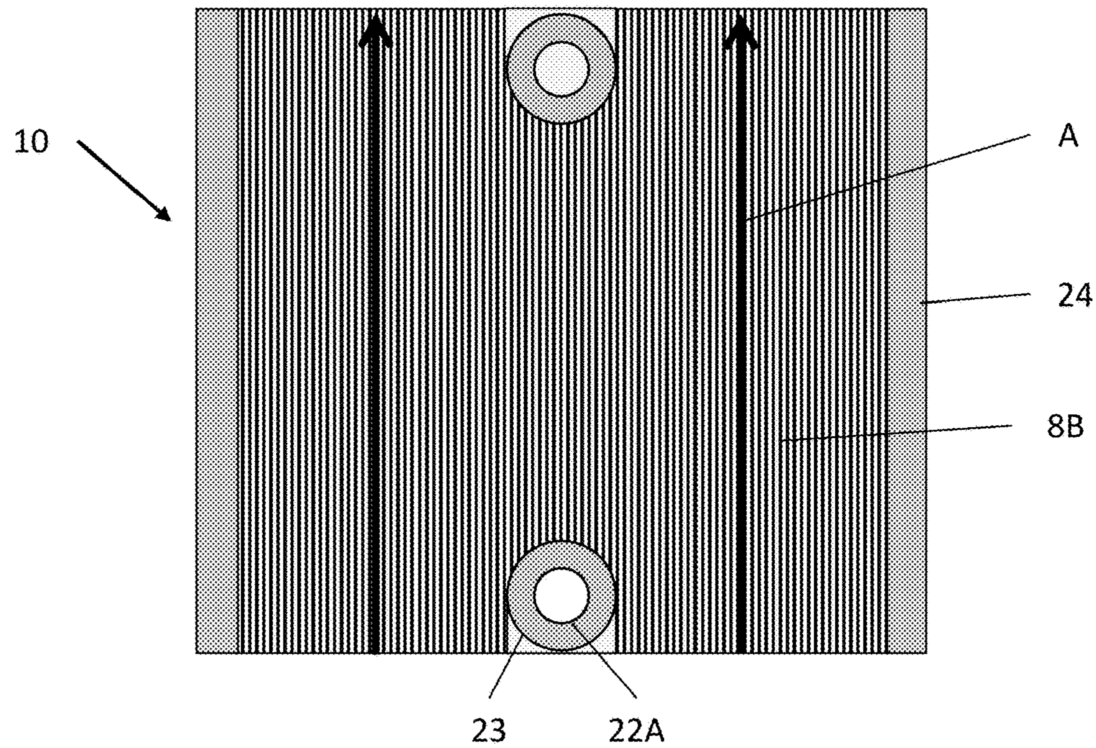
FIG. 2A (Related Art)
FIG. 2A is a top view of the air side of a conventional interconnect of the stack of FIG. 1B.
Figure 2B:
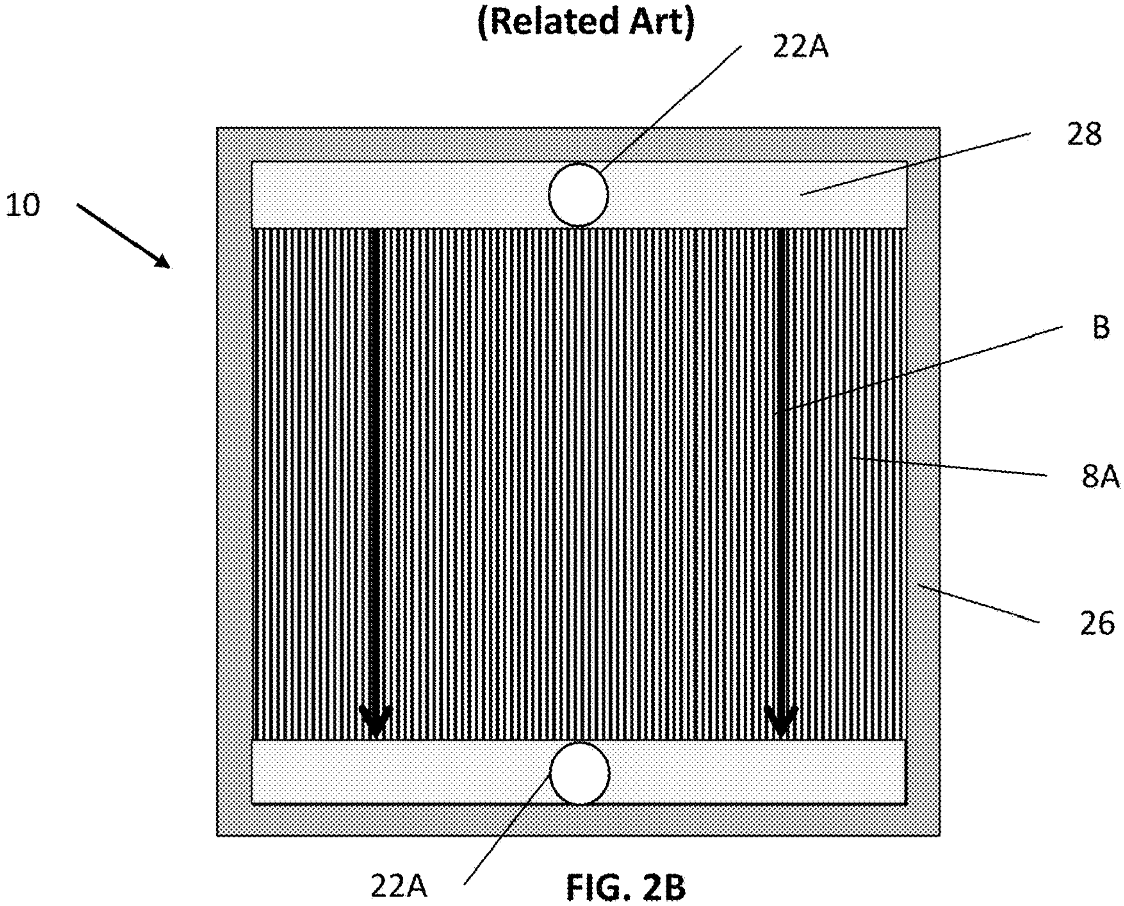
FIG. 2B (Related Art)
FIG. 2B is a top view of the fuel side of a conventional interconnect.

FIG. 2A is a top view of the air side of a conventional interconnect 10, and FIG. 2B is a top view of a fuel side of an interconnect 10. Referring to FIGS. 1C and 2A, the air side includes the air channels 8B. Air flows through the air channels 8B to a cathode electrode 3 of an adjacent fuel cell 1. In particular, the air may flow across the interconnect 10 in a first direction A as indicated by the arrows.

Ring seals 23 may surround fuel holes 22A of the interconnect 10, to prevent fuel from contacting the cathode electrode. Peripheral strip-shaped seals 24 are located on peripheral portions of the air side of the interconnect 10. The seals 23, 24 may be formed of a glass material. The peripheral portions may be in the form of an elevated plateau which does not include ribs or channels. The surface of the peripheral regions may be coplanar with tops of the ribs 12.

Referring to FIGS. 1C and 2B, the fuel side of the interconnect 10 may include the fuel channels 8A and fuel manifolds 28 (e.g., fuel plenums). Fuel flows from one of the fuel holes 22A, into the adjacent manifold 28, through the fuel channels 8A, and to an anode 7 of an adjacent fuel cell 1. Excess fuel and exhaust byproducts may flow into the other fuel manifold 28 and then into the adjacent fuel hole 22A. In particular, the fuel may flow across the interconnect 10 in a second direction B, as indicated by the arrows. The second direction B may be the same, perpendicular to, or opposite to the first direction A (see FIG. 2A).

A frame-shaped seal 26 is disposed on a peripheral region of the fuel side of the interconnect 10. The peripheral region may be an elevated plateau which does not include ribs or channels. The surface of the peripheral region may be coplanar with tops of the ribs 12.

Accordingly, a conventional counter-flow fuel cell column, as shown in FIGS. 1A, 1B, 1C, 2A, and 2B, may include complex fuel distribution systems (fuel rails and ASPs). In addition, the use of an internal fuel riser may require holes in fuel cells and corresponding seals, which may reduce an active area thereof and may cause cracks in the ceramic electrolytes of the fuel cells 1.

The fuel manifolds 28 may occupy a relatively large region of the interconnect 10, which may reduce the contact area between the interconnect 10 and an adjacent fuel cell by approximately 10%. The fuel manifolds 28 are also relatively deep, such that the fuel manifolds 28 represent relatively thin regions of the interconnect 10. Since the interconnect 10 is generally formed by a powder metallurgy compaction process, the density of fuel manifold regions may approach the theoretical density limit of the interconnect material. As such, the length of stroke of a compaction press used in the compaction process may be limited due to the high-density fuel manifold regions being incapable of being compacted further. As a result, the density achieved elsewhere in the interconnect 10 may be limited to a lower level by the limitation to the compaction stroke. The resultant density variation may lead to topographical variations, which may reduce the amount of contact between the interconnect 10 and fuel cell 1 and may result in lower stack yield and/or performance.

Another important consideration in fuel cell system design concerns operational efficiency. Maximizing fuel utilization is a key factor to achieving operational efficiency. Fuel utilization is the ratio of how much fuel is consumed during operation, relative to how much is delivered to a fuel cell. An important factor in preserving fuel cell cycle life may be avoiding fuel starvation in fuel cell active areas, by appropriately distributing fuel to the active areas. If there is a maldistribution of fuel such that some flow field channels receive insufficient fuel to support the electrochemical reaction that would occur in the region of that channel, it may result in fuel starvation in fuel cell areas adjacent that channel. In order to distribute fuel more uniformly, conventional interconnect designs include channel depth variations across the flow field. This may create complications not only in the manufacturing process, but may also require complex metrology to measure these dimensions accurately. The varying channel geometry may be constrained by the way fuel is distributed through fuel holes and distribution manifolds.

One possible solution to eliminate this complicated geometry and the fuel manifold is to have a wider fuel opening to ensure much more uniform fuel distribution across the fuel flow field. Since fuel manifold formation is a factor in density variation, elimination of fuel manifolds should enable more uniform interconnect density and permeability. Accordingly, there is a need for improved interconnects that provide for uniform contact with fuel cells, while also uniformly distributing fuel to the fuel cells without the use of conventional fuel manifolds.

Owing to the overall restrictions in expanding the size of a hotbox of a fuel cell system, there is also a need for improved interconnects designed to maximize fuel utilization and fuel cell active area, without increasing the footprint of a hotbox.

Figure 3A:
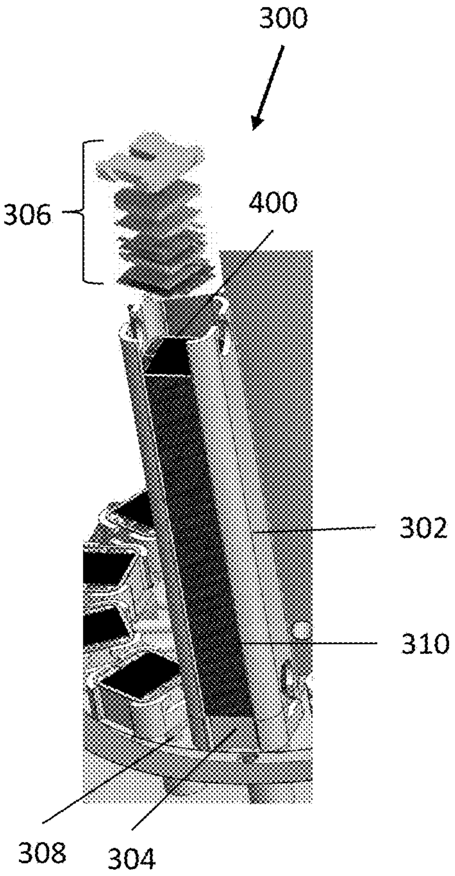
FIG. 3A is a perspective view of a fuel cell stack, according to various embodiments of the present disclosure.
Figure 3D:
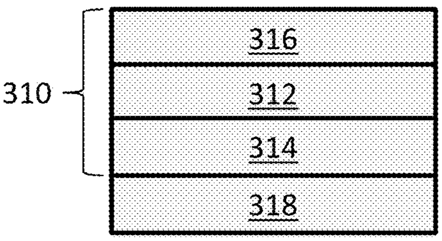
FIG. 3D is a schematic view of a fuel cell included in the stack of FIG. 3A.
Figure 3C:
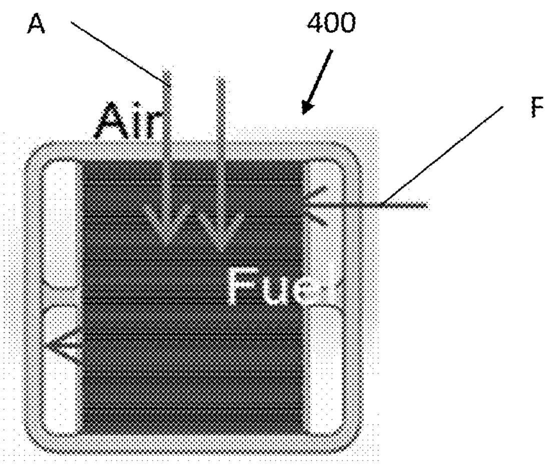
FIG. 3C is a top view of the fuel side of an interconnect included in the stack of FIG. 3A.
Figure 3B:
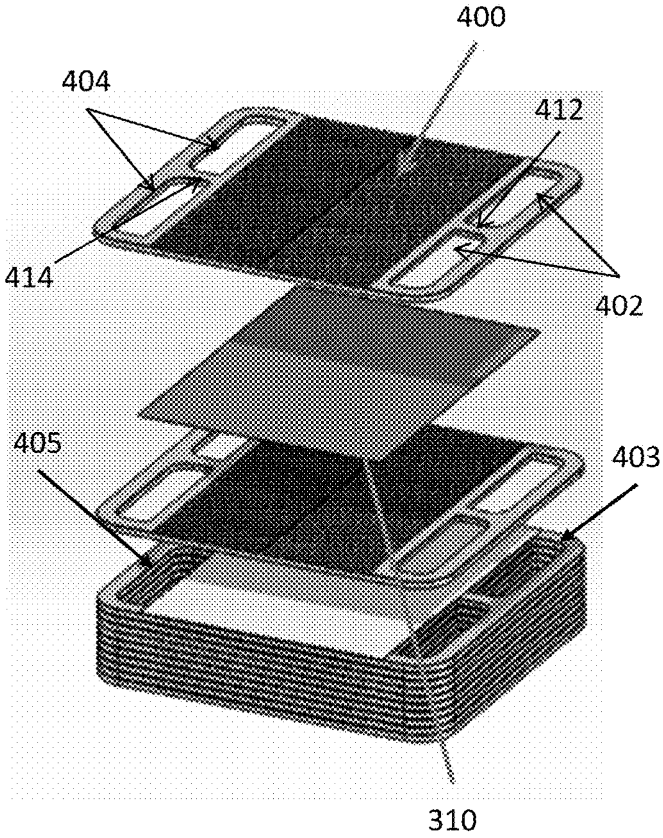
FIG. 3B is an exploded perspective view of a portion of the stack of FIG. 3A.

FIG. 3A is a perspective view of a fuel cell stack 300, according to various embodiments of the present disclosure, FIG. 3B is an exploded perspective view of a portion of the stack 300 of FIG. 3A, FIG. 3C is a top view of the fuel side of an interconnect 400 included in the stack 300, and FIG. 3D is a schematic view of a fuel cell included in the stack 300.

Referring to FIGS. 3A-3D, the fuel cell stack 300, which may also be referred to as a fuel cell column because it lacks ASPs, includes multiple fuel cells 310 that are separated by interconnects 400, which may also be referred to as gas flow separator plates or bipolar plates. One or more stacks 300 may be thermally integrated with other components of a fuel cell power generating system (e.g., one or more anode tail gas oxidizers, fuel reformers, fluid conduits and manifolds, etc.) in a common enclosure or "hotbox."

The interconnects 400 are made from an electrically conductive metal material. For example, the interconnects 400 may comprise a chromium alloy, such as a Cr—Fe alloy. A chromium-alloy interconnect 400 may comprise more than about 90% chromium by weight, such as about 94-96% (e.g., 95%) chromium by weight. An interconnect 400 may also contain less than about 10% iron by weight, such as about 4-6% (e.g., 5%) iron by weight, may contain less than about 2% by weight, such as about zero to 1% by weight, of other materials, such as yttrium or yttria, as well as residual or unavoidable impurities. Alternatively, any other suitable conductive interconnect material, such as stainless steel (e.g., terrific stainless steel, SS446, SS430, etc.) or iron-chromium alloy (e.g., Crofer™ 22 APU alloy which contains 20 to 24 wt % Cr, less than 1 wt % Mn, Ti and La, and balance Fe, or ZMG™ 232L alloy which contains 21 to 23 wt % Cr, 1 wt % Mn and less than 1 wt % Si, C, Ni, Al, Zr and La, and balance Fe), may be used to form the interconnect 400.

Each fuel cell 310 may include a solid oxide electrolyte 312, an anode 314, and a cathode 316. In some embodiments, the anode 314 and the cathode 316 may be printed on the electrolyte 312. In other embodiments, a conductive layer 318, such as a nickel mesh, may be disposed between the anode 314 and an adjacent interconnect 400.

Various materials may be used for the cathode electrode 316, electrolyte 312, and anode electrode 314. For example, the anode electrode 314 may comprise a cermet comprising a nickel containing phase and a ceramic phase. The nickel containing phase may consist entirely of nickel in a reduced state. This phase may form nickel oxide when it is in an oxidized state. Thus, the anode electrode 314 is preferably annealed in a reducing atmosphere prior to operation to reduce the nickel oxide to nickel. The nickel containing phase may include other metals in additional to nickel and/or nickel alloys. The ceramic phase may comprise a stabilized zirconia, such as yttria and/or scandia stabilized zirconia and/or a doped ceria, such as gadolinia, yttria and/or samaria doped ceria.

The electrolyte 312 may comprise a stabilized zirconia, such as scandia stabilized zirconia (SSZ) or yttria stabilized zirconia (YSZ). Alternatively, the electrolyte may comprise another ionically conductive material, such as a doped ceria.

The cathode 316 may comprise an electrically conductive material, such as an electrically conductive perovskite material, such as lanthanum strontium manganite (LSM). Other conductive perovskites, such as LSCo, etc., or metals, such as Pt, may also be used. The cathode electrode 316 may also contain a ceramic phase similar to the anode electrode 314. The electrodes and the electrolyte may each comprise one or more sublayers of one or more of the above described materials.

The fuel cell 310 does not include through holes, such as the fuel holes of conventional fuel cells. Therefore, the fuel cell 310 avoids cracks that may be generated due to the presence of such through holes.

An upper most interconnect 400 and a lowermost interconnect 400 of the stack 300 may be different ones of an air end plate or fuel end plate including features for providing air or fuel, respectively, to an adjacent end fuel cell 310. As used herein, an "interconnect" may refer to either an interconnect located between two fuel cells 310 or an end plate located at an end of the stack and directly adjacent to only one fuel cell 310. Since the stack 300 does not include anode splitter plates (ASPs) (i.e., fuel manifolds) and the end plates associated therewith, the stack 300 may include only two end plates. As a result, stack dimensional variations associated with the use of intra-column ASPs may be avoided.

The stack 300 may include side baffles 302, a fuel plenum 304, and a compression assembly 306. The side baffles 302 may be formed of a ceramic material and may be disposed on opposing sides of the fuel cell stack 300 containing stacked fuel cells 310 and interconnects 400. The side baffles 302 may connect the fuel plenum 304 and the compression assembly 306, such that the compression assembly 306 may apply pressure to the stack 300. The side baffles 302 may be curved baffle plates, such each baffle plate covers at least portions of three sides of the fuel cell stack 300. For example, one baffle plate may fully cover the fuel inlet riser side of the stack 300 and partially covers the adjacent front and back sides of the stack, while the other baffle plate fully covers the fuel outlet riser side of the stack and partially covers the adjacent portions of the front and back sides of the stack. The remaining uncovered portions for the front and back sides of the stack allow the air to flow through the stack 300. The curved baffle plates provide an improved air flow control through the stack compared to the conventional baffle plates 38 which cover only one side of the stack. The fuel plenum 304 may be disposed below the stack 300 and may be configured to provide a hydrogen-containing fuel to the stack 300, and may receive an anode fuel exhaust from the stack 300. The fuel plenum 304 may be connected to fuel inlet and outlet conduits 308 which are located below the fuel plenum 304.

Each interconnect 400 electrically connects adjacent fuel cells 310 in the stack 300. In particular, an interconnect 400 may electrically connect the anode electrode of one fuel cell 310 to the cathode electrode of an adjacent fuel cell 310. As shown in FIG. 3C, each interconnect 400 may be configured to channel air in a first direction A on one side of the interconnect 400, such that the air may be provided to the cathode of an adjacent fuel cell 310. Each interconnect 400 may also be configured to channel fuel in a second direction F on one side of the interconnect 400, such that the fuel may be provided to the anode of an adjacent fuel cell 310. Directions A and F may be perpendicular, or substantially perpendicular to each other. As such, the interconnects 400 may be referred to as cross-flow interconnects.

The interconnect 400 may include fuel holes that extend through the interconnect 400. The fuel holes are configured for fuel distribution. For example, the fuel holes may include one or more fuel inlets 402 and one or more fuel outlets 404, which may also be referred to as anode exhaust outlets 404. The fuel inlets and outlets 402, 404 may be disposed outside of the perimeter of the fuel cells 310. As such, the fuel cells 310 may be formed without corresponding through holes for fuel flow. The combined length of the fuel inlets 402 and/or the combined length of the fuel outlets 404 may be at least 75% of a corresponding length of the interconnect 400 e.g., a length taken in direction A.

In one embodiment, each interconnect 400 contains two fuel inlets 402 separated by a neck portion 412 of the interconnect 400, as shown in FIG. 3B. However, more than two fuel inlets 402 may be included, such as three to five inlets separated by two to four neck portions 412. In one embodiment, each interconnect 400 contains two fuel outlets 404 separated by a neck portion 414 of the interconnect 400, as shown in FIG. 3B. However, more than two fuel outlets 404 may be included, such as three to five outlets separated by two to four neck portions 414.

The fuel inlets 402 of adjacent interconnects 400 may be aligned in the stack 300 to form one or more fuel inlet risers 403. The fuel outlets 404 of adjacent interconnects 400 may be aligned in the stack 300 to form one or more fuel outlet risers 405. The fuel inlet riser 403 may be configured to distribute fuel received from the fuel plenum 304 to the fuel cells 310. The fuel outlet riser 405 may be configured to provide anode exhaust received from the fuel cells 310 to the fuel plenum 304.

Unlike the flat related art side baffles 38 of FIG. 1A, the side baffles 302 may be curved around edges of the interconnects 400. In particular, the side baffles 302 may be disposed around the fuel inlets 402 and outlets 404 of the interconnects 400. Accordingly, the side baffles may more efficiently control air flow through air channels of the interconnects 400, which are exposed between the side baffles 302 and are described in detail with regard to FIGS. 4A and 4B.

In various embodiments, the stack 300 may include at least 30, at least 40, at least 50, or at least 60 fuel cells, which may be provided with fuel using only the fuel risers 403. In other words, as compared to a conventional fuel cell system, the cross-flow configuration allows for a large number of fuel cells to be provided with fuel, without the need for ASPs or external stack fuel manifolds, such as external conduits 32, 34 shown in FIG. 1A.

Each interconnect 400 may be made of or may contain electrically conductive material, such as a metal alloy (e.g., chromium-iron alloy) which has a similar coefficient of thermal expansion to that of the solid oxide electrolyte in the cells (e.g., a difference of 0-10%). For example, the interconnects 400 may comprise a metal (e.g., a chromium-iron alloy, such as 4-6 weight percent iron, optionally 1 or less weight percent yttrium and balance chromium alloy), and may electrically connect the anode or fuel-side of one fuel cell 310 to the cathode or air-side of an adjacent fuel cell 310. An electrically conductive contact layer, such as a nickel contact layer (e.g., a nickel mesh), may be provided between anode and each interconnect 400. Another optional electrically conductive contact layer may be provided between the cathode electrodes and each interconnect 400.

Figure 4A:
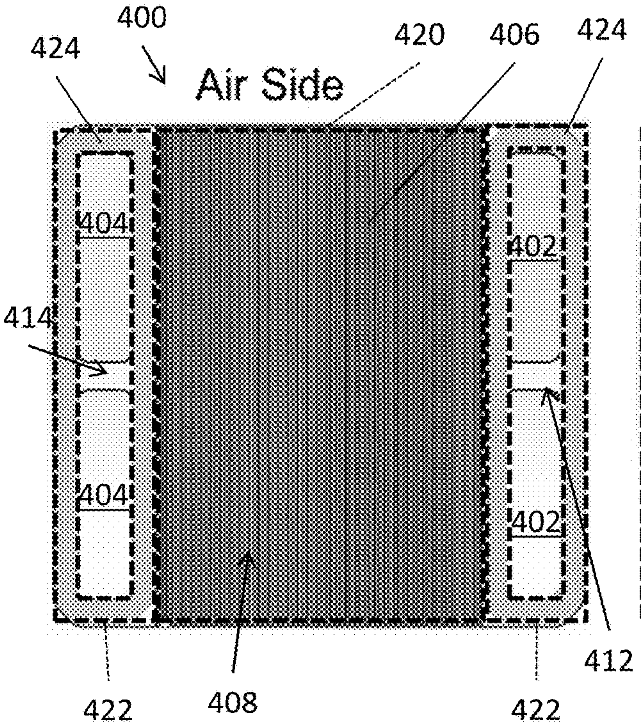
FIGS. 4A and 4B are plan views showing, respectively, an air side and a fuel side of the cross-flow interconnect of FIG. 3C, according to various embodiments of the present disclosure.
Figure 4B:
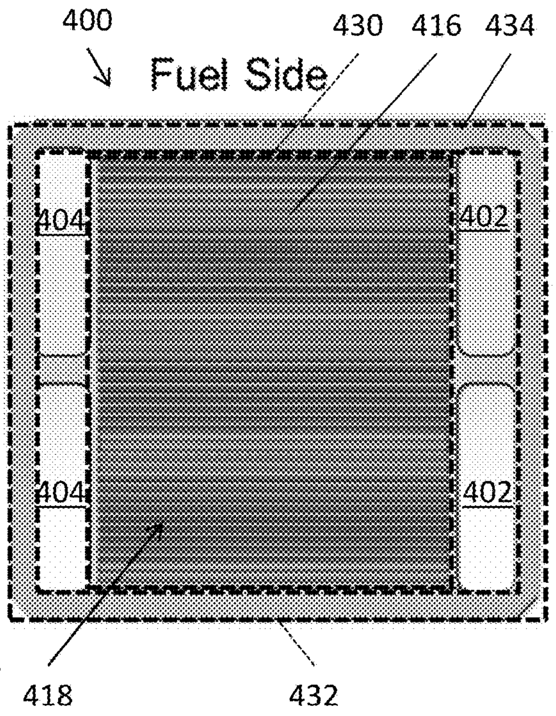

FIGS. 4A and 4B are plan views showing, respectively, an air side and a fuel side of the cross-flow interconnect 400, according to various embodiments of the present disclosure. Referring to FIG. 4A, the air side of the interconnect 400 may include ribs 406 configured to at least partially define air channels 408 configured to provide air to the cathode of a fuel cell 310 disposed thereon. The air side of the interconnect 400 may be divided into an air flow field 420 including the air channels 408, and riser seal surfaces 422 disposed on two opposing sides of the air flow field 420. One of the riser seal surfaces 422 may surround the fuel inlets 402 and the other riser seal surface 422 may surround the fuel outlets 404. The air channels 408 and ribs 406 may extend completely across the air side of the interconnect 400, such that the air channels 408 and ribs 406 terminate at opposing peripheral edges of the interconnect 400. In other words, when assembled into a stack 300, opposing ends of the air channels 408 and ribs 406 are disposed on opposing (e.g., front and back) outer surfaces of the stack, to allow air to flow through the stack. Therefore, the stack may be externally manifolded for air.

Riser seals 424 may be disposed on the riser seal surfaces 422. For example, one riser seal 424 may surround the fuel inlets 402, and one riser seal 424 may surround the fuel outlets 404. The riser seals 424 may prevent fuel and/or anode exhaust from entering the air flow field 420 and contacting the cathode of the fuel cell 310. The riser seals 424 may also operate to prevent fuel from leaking out of the fuel cell stack 100 (see FIG. 3A).

Referring to FIG. 4B, the fuel side of the interconnect 400 may include ribs 416 that at least partially define fuel channels 418 configured to provide fuel to the anode of a fuel cell 310 disposed thereon. The fuel side of the interconnect 400 may be divided into a fuel flow field 430 including the fuel channels 418, and a perimeter seal surface 432 surrounding the fuel flow field 430 and the fuel inlets and outlets 402, 404. The ribs 416 and fuel channels 418 may extend in a direction that is perpendicular or substantially perpendicular to the direction in which the air-side channels 408 and ribs 406 extend.

A frame-shaped perimeter seal 434 may be disposed on the perimeter seal surface 432. The perimeter seal 434 may be configured to prevent air entering the fuel flow field 430 and contacting the anode on an adjacent fuel cell 310. The perimeter seal 434 may also operate to prevent fuel from exiting the fuel risers 403, 405 and leaking out of the fuel cell stack 300 (see FIGS. 3A and 3B).

The seals 424, 434 may comprise a glass or ceramic seal material. The seal material may have a low electrical conductivity. In some embodiments, the seals 424, 434 may be formed by printing one or more layers of seal material on the interconnect 400, followed by sintering.

Figure 4C:
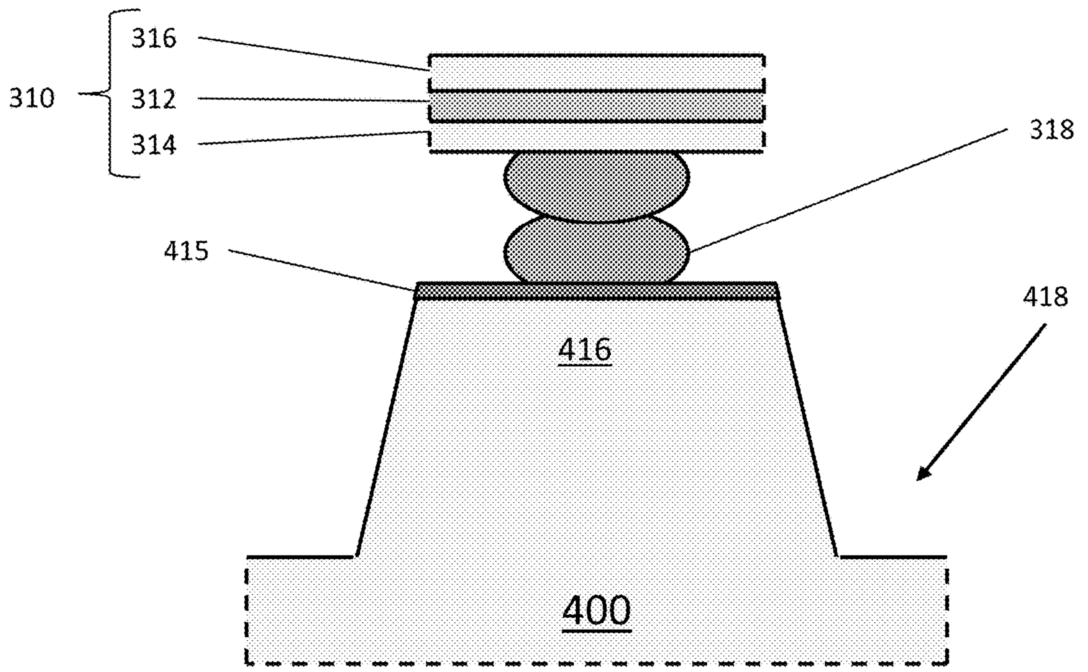
FIG. 4C is a sectional view of a fuel-side rib of an interconnect and an anode of an adjacent fuel cell, according to various embodiments of the present disclosure.

FIG. 4C is a sectional view illustrating one of the fuel-side ribs 416 of the interconnect 400 and the anode 314 of an adjacent fuel cell 310, according to various embodiments of the present disclosure. Referring to FIG. 4C, the interconnect 400 is electrically connected to the anode 314 by a Ni mesh 318 covering the fuel side of the interconnect 400. The Ni mesh 318 may operate as a current collector with respect to the anode 314. Although only one fuel-side rib 416 is shown, each fuel-side rib 416 of the interconnect 400 may be connected to the anode 314 in a similar manner.

Conventionally, oxides or other contaminants may form over time on the surface of an interconnect, and in particular, at an interface between a Ni mesh and corresponding ribs of the interconnect. As such, the contact resistance between the Ni mesh and an interconnect may increase, which may reduce the useful life of a fuel cell stack.

Referring again to FIG. 4C, the interconnect 400 may include a contact layer 415 configured to prevent or reduce such an increase in contact resistance. In particular, the contact layer 415 may be formed on the tips of the ribs 416. For example, the contact layer 415 may be disposed at an interface between the interconnect 400 and the Ni mesh 318 (e.g., between the rib 416 and the Ni mesh 318). In some embodiments, the contact layer 415 may cover substantially all of the upper (e.g., distal) surface of the rib 416. However, in other embodiments, the contact layer 415 may cover only a portion of the tip of the rib 416.

The contact layer 415 may have a higher iron content than the interconnect 400. For example, the contact layer 415 may have greater than 7 wt % iron, such as from about 10 to about 95 wt % iron, or about 20 to about 80 wt % iron, while the interconnect 400 may include an alloy having from about 4 to about 6 wt % iron. Accordingly, the contact layer 415 may operate to prevent oxide growth at the interface between the rib 416 and the Ni mesh 318. The contact layer 415 may also improve the metallurgical joining of the Ni mesh 318 and the interconnect 400.

In some embodiments, the thickness (e.g., depth) and/or width of the contact layer 415 may be controlled to reduce mechanical distortion of the interconnect 400. For example, the thickness of the contact layer 415 may range from about 5 to about 1000 μm. The contact layer 415 may have an iron to chromium ratio that varies in the thickness direction thereof. For example, the iron to chromium ratio may increase as a distance from the tip of the rib 416 to the top surface of the contact layer 415 increases.

According to various embodiments, the contact layer 415 may be formed by depositing an iron-based material, such as metallic iron or iron oxide, on the tips of the ribs 416. The interconnect 400 can then be sintered, such that the iron and chromium in the interconnect at least partially inter-diffuse, thereby creating the contact layer 415. In particular, iron of the contact layer 415 may partially diffuse into the tip of the rib 416, and chromium of the interconnect 400 may partially diffuse into the contact layer 415.

In some embodiments, the contact layer 415 may be formed by disposing iron wire on the tips of the ribs 416. The interconnect 400 may then be sintered to facilitate iron and chromium inter-diffusion, as described above. The iron wire may have a thickness (e.g., diameter) ranging from about 10 to 300 microns, such as from about 15 to about 250 microns, or from about 20 to about 200 microns.

In some embodiments, the iron wire may be deposited on an interconnect powder, and the resultant structure may be compressed into the shape of an interconnect, followed by sintering. In other embodiments, the iron wire may be deposited on a compressed interconnect, and the resultant structure may then be sintered.

In some embodiments, the contact layer 415 may be formed by contacting an iron powder to the tip of the rib 416. The iron powder may have an average particle size ranging from about 20 to about 400 microns, such as from about 25 to about 350 microns, or from about 30 to about 300 microns. In some embodiments, the iron powder may be deposited on an interconnect powder, and the resultant structure may be compressed into the shape of an interconnect, followed by sintering. For example, the interconnect powder may be deposited into a die cavity using a first shoe, and then the iron powder may then be deposited onto the interconnect powder using a second shoe or by a spraying process.

In other embodiments, the iron powder may be deposited on a compressed interconnect, or the compressed interconnect may be placed onto the iron powder ribs down, and the resultant structure may then be sintered. Methods of forming interconnects will be discussed in more detail below.

Figure 4D:
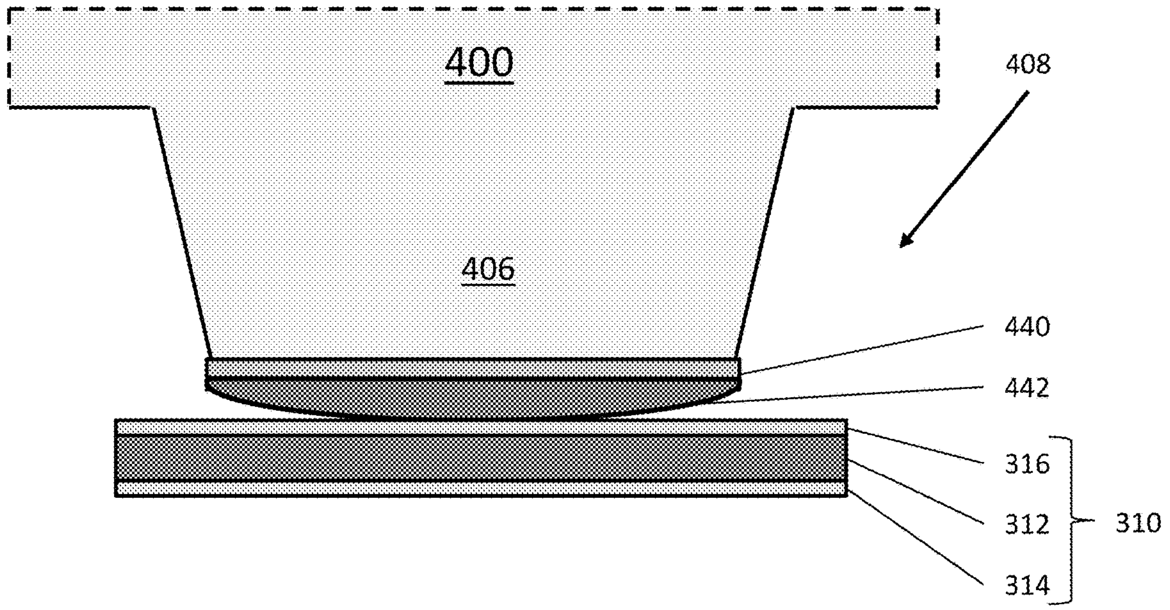
FIG. 4D is a sectional view of a fuel cell connected to the air side of an interconnect, according to various embodiments of the present disclosure.

FIG. 4D is a sectional view of a fuel cell 310 connected to the air side of an interconnect 400, according to various embodiments of the present disclosure. Referring to FIG. 4D, a protective coating or layer 440 may be disposed on the air side of the interconnect 400, and a cathode contact layer (CCL) 442 may be disposed on the coating 440. In some embodiments, the protective coating 440 and/or the CCL 442 may be deposited only on the tops of the cathode side ribs 406, without depositing the protective coating 440 and/or the CCL 442 in the oxidant (e.g., air) channels 408 (i.e., without depositing the coating 440 and/or the CCL 442 on or over the sidewalls of the ribs 406 and/or without depositing the coating 440 and/or the CCL on or over the bottom of the oxidant channels 408).

The coating 440 may be configured to limit the diffusion of chromium ions (e.g., $Cr^{3+}$) from the interconnect 400 into cathode 316 and into seals 424. The coating 440 may also be configured to suppress the formation of native oxide on the surface of the interconnect 400. The native oxide is formed when oxygen reacts with chromium in the interconnect alloy to form a relatively high resistance layer of $Cr_2O_3$. If the interconnect coating 440 can suppress the transport of oxygen and water vapor from the air to the surface of the interconnect 400, then the kinetics of oxide growth can be reduced.

According to various embodiments, the coating 440 may include a metal oxide spinel material, such as a manganese cobalt oxide (MCO) spinel material and/or a perovskite material, such as lanthanum strontium manganite (LSM). In an embodiment, the MCO spinel material encompasses the compositional range from $Mn_2CoO_4$ to $Co_2MnO_4$. That is, any spinel material having the composition $Mn_{2-x}Co_{1+x}O_4$ ($0 \le x \le 1$) or written as $z(Mn_3O_4)+(1-z)(Co_3O_4)$, where ($1/3 \le z \le 2/3$) or written as $(Mn, Co)_3O_4$ may be used, such as $Mn_{1.5}Co_{1.5}O_4$, $MnCo_2O_4$ or $Mn_2CoO_4$. The coating 440 may also be a mixed layer of MCO and LSM. Many of the spinels that contain transition metals exhibit good electronic conductivities and reasonably low anion and cation diffusivities and are therefore suitable coating materials. Examples of such materials may be found in U.S. Published Patent Application No. 2013/0230792 and U.S. Pat. No. 9,452,475, which are incorporated herein by reference in their entirety.

The CCL 442 may be an electrically conductive metal oxide layer configured to improve an electrical connection between the interconnect 400 and the cathode 316. In some embodiments, the CCL 442 may include metal oxide materials that have a low cation diffusivity in the perovskite family, such as a lanthanum strontium oxide, e.g., $La_{1-x}Sr_xMnO_3$ (LSM), where $0.1 \le x \le 0.3$, such as $0.1 \le x \le 0.2$. In the case of LSM, the material has high electronic conductivity yet low anion and cation diffusion. Other perovskites such as $La_{1-x}Sr_xFeO_{3-d}$, $La_{1-x}Sr_xCoO_{3-d}$, and $La_{1-x}Sr_xCo_{1-y}Fe_yO_{3-d}$ all exhibit high electronic conduction and low cation conduction (low chromium diffusion rates) and may be used as the CCL 442.

Such materials generally have sintering temperatures of more than 1000° C. However, such temperatures may result in the oxidation of metal alloys included in the interconnect 400. As such, it may be difficult to properly sinter a CCL 442.

In view of the above and/or other problems, the CCL 442 may include a sintering aid configured to increase the density of the CCL 442 and to improve interfacial strength, and increase layer bonding. In some embodiments, the CCL 442 may include a glass material as a sintering aid. The glass material may be included at an amount less than about 15 wt %, such as from about 1 to about 10 wt %, such as from about 4 to about 10 wt %, with the remainder of the CCL 442 being a conductive perovskite metal oxide, such as LSM. In particular, glass amounts of greater that about 15 wt % may unnecessarily reduce the conductivity of the CCL 442.

In addition to better sintering, the addition of the glass material may make the CCL 442 more compliant and tolerant to mechanical stresses induced by thermal cycles during SOFC operation. As such, the glass material may be selected from glass materials that have a relatively low glass transition (Tg) or softening temperature, to avoid crystallization. In particular, the glass material may have a Tg or softening temperature that is low enough to allow the glass material to remain viscous at temperatures below 1000° C., such as temperatures of from about 400 to about 900° C. In some embodiments, selected glass materials may have a glass transition temperature of 900° C. or less, such as 825° C. or less, such as ranging from about 450 to about 550° C. For example, the glass material may remain viscous at fuel cell operating temperatures ranging from about 800 to about 900° C., such as from about 830 to about 860° C. Remaining viscous at such temperatures allows the CCL 442 to conform to the tops of the air-side ribs of the interconnect 400. Accordingly, the CCL 442 allows for improved coverage of rib tops, an increased effective contact surface area, reduced degradation, and the ability to self-heal cracks formed during thermal cycling.

According to various embodiments, the glass material may be selected from various compositions, such as alumino-silicate, boro-silicate, boro-aluminate, and alkali-free compositions, and may include Al, Si, Ca, Ba, B, La, Sr, Mg, or mixtures thereof.

Laser Sintering of Air Side Coating

Figure 5:
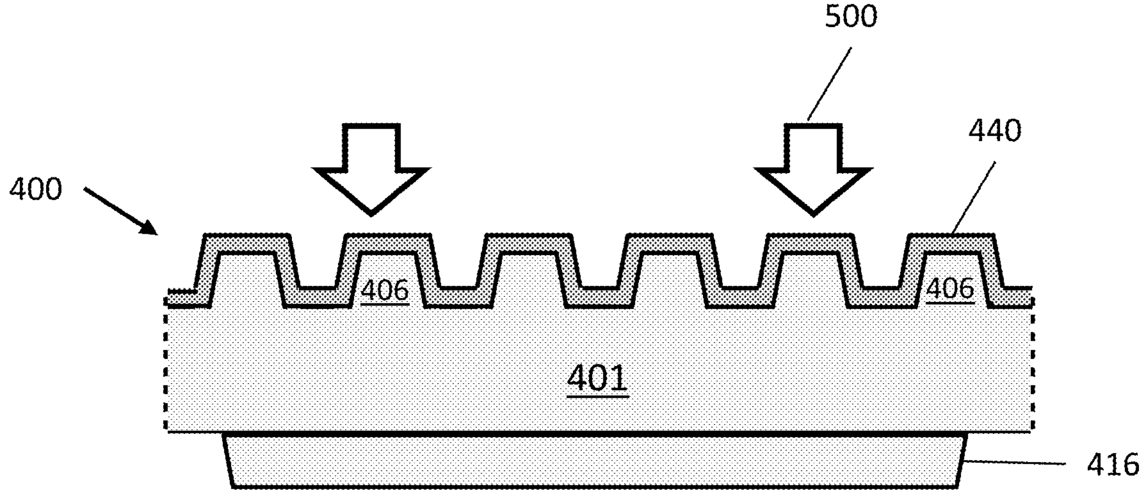
FIG. 5 is a sectional view of an interconnect containing an air side coating formed by laser sintering, according to various embodiments of the present disclosure.

Referring to FIGS. 4D and 5, in one embodiment, the protective coating 440 may be formed on the air side of the interconnect 400 using a laser sintering method. The laser sintering method forms a dense adhesive protective coating 440 which suppresses chromium evaporation from the interconnect and reduces interconnect 400 oxidation. As described above, the protective coating material may include perovskite materials, such as lanthanum strontium manganite (LSM) or other perovskites described above, spinel materials, such as manganese cobalt oxide (MCO), or mixtures thereof.

In one embodiment, a protective coating powder is deposited on the air side of the interconnect 400 via a wet process (e.g., from a suspension containing a solvent), optionally dried, and then sintered with a laser. The suspension may also be referred to as an ink. The wet process may include an aqueous (i.e., water based) solvent and/or an organic solvent. The suspension (e.g., the ink) may also include a binder and/or plasticizer in addition to the protective coating powder and the solvent. Non-limiting examples of the wet process include but are not limited to spray coating, dip coating, screen printing, electrochemical plating, electrophoresis, electrostatic attraction, pad printing, roller coating or tape casting (also known as doctor blading or knife coating). In pad printing, a suspension of a powder in a solvent is deposited onto a sponge having a negative surface profile of the ribs and channels on the air side of the interconnect. The sponge is then contacted against the air side of the interconnect to transfer the suspension to the air side of the interconnect. In roller coating, a roller containing the suspension of a powder in a solvent is rolled against the air side of the interconnect, similar to a paint roller. The powder may have the same composition as the protective coating 440 or may comprise an intermediate powder which is converted into the protective coating during or after laser sintering.

In one embodiment, the deposited wet suspension (e.g., the ink coated interconnect) is subject to laser sintering without first drying the suspension. The solvent and the optional binder and/or plasticizer are removed from the ink during the laser sintering. In another embodiment, the suspension (e.g., ink) is dried at a relatively low temperature (e.g., between 100 and 200° C.) to remove (e.g., evaporate) the solvent without removing the binder and/or plasticizer prior to the laser sintering. The remaining binder and/or plasticizer are then removed from the dried powder during the laser sintering. In another embodiment, the suspension (e.g., ink) is dried at a relatively high temperature (e.g., between 400 and 600° C.) to remove (e.g., evaporate) the solvent as well as to remove (i.e., burn out) the binder and/or plasticizer prior to the laser sintering. The dry powder is then laser sintered.

In one embodiment, the starting powders which are applied to the air side of the interconnect comprise metal oxide powders, such as perovskite and/or spinel powders. Examples of perovskite oxide phases include LSM, which may have a formula $(La_{1-x}Sr_x)_yMnO_{3-d}$ where $0<x\leq 0.2$, for example $0.1\leq x\leq 0.2$, $0.95\leq y\leq 1$, and $0\leq d\leq 0.05$, such as $(La_{0.9}Sr_{0.1})_{0.98}MnO_{3-d}$ or $(La_{0.8}Sr_{0.2})_{0.97}MnO_{3-d}$. Examples of spinel phases include MCO, which may have a formula $Mn_{2-x}Co_{1+x}O_4$ where $0<x<1$, such as $Mn_{1.5}Co_{1.5}O_4$, $Mn_2Co_1O_4$, or $Mn_1Co_2O_4$. Other spinel phases include manganese copper oxide, manganese copper cobalt oxide, manganese iron oxide, cobalt iron oxide, manganese copper nickel oxide, or nickel cobalt iron oxide, for example $Mn_{1.7}Cu_{1.3}O_4$, $Mn_1Co_{1.5}Cu_{0.5}O_4$, $Mn_{1.5}Co_{1.7}Cu_{0.3}O_4$, $Mn_{1.4}Co_{1.4}Cu_{0.2}O_4$, $Mn_{1.78}Ni_{0.45}Cu_{0.77}O_4$, $Mn_1Co_{1.7}Fe_{0.3}O_4$, $Ni_1Co_1Fe_1O_4$, or $Co_1Fe_2O_4$.

In this embodiment, a single powder such as LSM or MCO is deposited on the air side of the interconnect 400 via a wet process (e.g., from a suspension containing a solvent), optionally dried, and then sintered with a laser. Alternatively, a powder blend, such as a blend of perovskite and spinel powders, such as a blend of LSM and MCO powders may be deposited, optionally dried and then laser sintered. The blend may contain 30 to 70 weight percent perovskite and 70 to 30 weight percent spinel, such as 50 wt. % LSM and 50 wt. % MCO for example.

As shown in FIG. 5, a laser beam 500 is scanned across the wet or dried powder coating to sinter the dried powder coating to form the protective coating 440. The powder may be optionally melted during the laser sintering. Any suitable laser may be used which is capable of sintering the powder.

Depending on the atmosphere during laser sintering, and specifically partial pressure of oxygen in the sintering atmosphere, the final phases of the coating materials may be non-stoichiometric. However, upon heating in a fuel cell stack, the oxide phases will reassemble and equilibrate (e.g., become stoichiometric) with local oxidizing atmosphere, such as air for example.

In another embodiment, the starting powders comprise metal powders rather than oxide powders. For example, metal powders can include two or more of Mn, Co, Ni, Cu and/or Fe metal powders with average particle sizes between 0.1 and 10 microns. The metal powders may be blended at various ratios, deposited by a wet process on the air side of the interconnect 400, optionally dried, and then sintered with the laser beam 500. The metal powders may optionally be melted during the laser sintering.

The laser sintered metal coating may be oxidized to form the protective coating 440. The oxidation may be conducted during the laser sintering, after the laser sintering but before placing the interconnect into a fuel cell or electrolyzer stack, or during use in the fuel cell or electrolyzer stack. Thus, the laser sintering atmosphere may comprise vacuum, air, oxygen or an inert atmosphere, such as nitrogen or noble gas (e.g., argon) atmosphere.

The laser sintered coating may be metallic in nature, a mixture of metals and oxides, or an oxide. For example, to form the MCO spinel phase composition $Mn_{1.5}Co_{1.5}O_4$, a 1:1 ratio of Co and Mn metal powders is deposited on the interconnect and laser sintered. After laser sintering, and depending on atmospheric conditions, a resulting coating can be metallic and comprise Co and Mn metals (e.g., if laser sintered in a non-oxidizing ambient), or a mixture of oxides and metals, for example Co metal and Mn oxide or Co oxide and Mn metal (e.g., if laser sintered in a mixed oxygen containing atmosphere), or a mixture of binary oxides such as $MnO_x$ and $CoO_x$, or a final oxide phase such as MCO (e.g., if laser sintered in an oxidizing ambient). Regardless of the makeup of the intermediate coating phase, after subsequent heating of the interconnect coating in a fuel cell or electrolyzer stack, the phase of the coating will assemble and equilibrate based on temperature and atmosphere. To form conductive spinel phases, powder blends can be comprised of various blends and ratios of Ni, Fe, Mn, Co, and/or Cu metal powders. Some examples include but are not limited to Mn—Fe, Mn—Co, Ni—Fe, Ni—Co, Cu—Mn, Mn—Co—Fe, Mn—Co—Cu, Ni—Mn—Co, Ni—Mn—Fe, or Mn—Co—Fe—Cu.

In another embodiment, the starting powders are intermediate metal oxide powders such as binary oxides which then form a ternary metal oxide protective coating 440. Examples of binary oxides include, but are not limited to MnO, $Mn_2O_3$, $Mn_3O_4$, FeO, $Fe_2O_3$, $Fe_3O_4$, NiO, CuO, and/or $Co_2O_3$. The oxide powers are mixed at specific ratios to form spinel phases. For example, a 50% molar mixture of MnO and CoO may be used to form a final protective coating having the $Mn_{1.5}Co_{1.5}O_4$ composition. The oxide powder blends are deposited on the interconnect 400 by a wet process, optionally dried, and laser sintered. The oxide powders may optionally be melted during the laser sintering. Upon thermal treatment outside or within the fuel cell or electrolyzer stack, the phase of the coating will assemble and equilibrate based on temperature and atmosphere.

In another embodiment, starting powders are a mixture of one or more metal powders and one or more metal oxide powders such as binary oxides or ternary oxides (e.g., perovskite and/or spinel powders) described above. For example, a single phase powder, such as LSM or MCO, is blended with either a metal powder, such as Mn, Co, Ni, Cu, and/or Fe, and/or with another oxide powder, such as a binary oxide powder. Examples of binary oxides include, but are not limited to MnO, $Mn_2O_3$, $Mn_3O_4$, FeO, $Fe_2O_3$, $Fe_3O_4$, NiO, CuO, and/or $Co_2O_3$.

A non-limiting example includes a mixture of MCO powder and $Fe_2O_3$ powder, with a weight percentage between 5% and 95% of each constituent, such as 80 wt. % MCO and 20 wt. % $Fe_2O_3$ powders or 95 wt. % MCO and 5 wt. % $Fe_2O_3$ powders. Another example includes a mixture of MCO powder with Fe metal powder, with a weight percentage between 5% and 95% of each constituent, such as 80 wt. % MCO and 20 wt. % Fe or 95 wt. % MCO and 5 wt. % Fe. The powders are deposited onto the air side of the interconnect, optionally dried, and sintered with a laser. Upon heat treatment in an oxidizing atmosphere, such as an air atmosphere, for example in a fuel cell or electrolyzer stack or prior to being placed into the stack, the resulting coating comprises two or more oxide phases. For example, MCO and Fe starting powder may result in a composite coating comprised of MCO, iron oxide and one or more optional intermediate interfacial oxides.

The laser sintering of the protective coating 440 reduces fabrication cost, improves coating performance, and increased coating thickness uniformity.

Fuel cell systems of the embodiments of the present disclosure are designed to reduce greenhouse gas emissions and have a positive impact on the climate.

Although the foregoing refers to particular preferred embodiments, it will be understood that the invention is not so limited. It will occur to those of ordinary skill in the art that various modifications may be made to the disclosed embodiments and that such modifications are intended to be within the scope of the invention. All of the publications, patent applications and patents cited herein are incorporated herein by reference in their entirety.

What is claimed is:

1. A method of forming an electrochemical device stack, comprising:

depositing a coating on an interconnect using a wet coating process, the coating comprising at least one metal or metal oxide powder and a plasticizer;

drying the coating;

laser sintering the dried coating to form a protective layer on the interconnect; and placing the interconnect between fuel cells or electrolyzer cells after forming the protective layer to form the electrochemical device stack, wherein the plasticizer is burned out during at least one of the drying or the laser sintering.

2. The method of claim 1, wherein the electrochemical device stack comprises a solid oxide fuel cell stack.

3. The method of claim 2, further comprising oxidizing the protective layer in the solid oxide fuel cell stack.

4. The method of claim 1, wherein the electrochemical device stack comprises a solid oxide electrolyzer cell stack.

5. The method of claim 4, further comprising oxidizing the protective layer in the solid oxide electrolyzer cell stack.

6. The method of claim 1, wherein the powder comprises a spinel or perovskite metal oxide powder.

7. The method of claim 1, wherein the powder comprises a mixture of spinel and perovskite metal oxide powders.

8. The method of claim 7, wherein the powder comprises a mixture of lanthanum strontium manganite and manganese cobalt oxide powders, and the protective layer comprises a mixture of lanthanum strontium manganite and manganese cobalt oxide.

9. The method of claim 1, wherein the protective layer comprises a mixture of lanthanum strontium manganite and manganese cobalt oxide.

10. The method of claim 1, further comprising oxidizing the powder during the laser sintering to form the protective layer which comprises a metal oxide.

11. The method of claim 1, further comprising oxidizing the powder after the laser sintering to form the protective layer which comprises a metal oxide.

12. The method of claim 1, wherein the coating is formed by depositing the powder on an air side of the interconnect from a suspension.

13. The method of claim 12, wherein:

the step of drying the coating comprises evaporating a solvent from the suspension at a temperature between 100 and 200° C., without removing the plasticizer; and the step of laser sintering the dried coating burns out the plasticizer from the dried coating.

14. The method of claim 12, wherein the step of drying the coating comprises evaporating the solvent and burning out the plasticizer from the suspension at a temperature between 400 and 600° C.

15. The method of claim 12, wherein the wet coating process comprises spray coating the powder, dip coating the powder, screen printing the powder, tape casting the powder, pad printing the powder, or roller coating the powder.

16. The method of claim 1, wherein the powder comprises a mixture of two or more powders.

17. The method of claim 16, wherein the mixture of two or more powders comprises a mixture of two or more metal powders or a mixture of at least one metal powder and at least one metal oxide powder.

18. The method of claim 16, wherein the mixture of two or more powders comprises a mixture of two or more binary metal oxide powders.

19. A method of forming an electrochemical device stack, comprising:

depositing a coating on an interconnect using a wet coating process, the coating comprising at least one metal or metal oxide powder and a plasticizer;

laser sintering the coating to burn out the plasticizer and to form a protective layer on the interconnect; and placing the interconnect between fuel cells or electrolyzer cells after forming the protective layer to form the electrochemical device stack.

20. The method of claim 19, wherein:

the powder comprises particles of the at least one metal; and the laser sintering further comprises oxidizing the particles.

21. The method of claim 19, wherein:

the powder comprises particles of the at least one metal; and the method further comprises oxidizing the particles in the electrochemical device stack.

* * * * *